Patented Nov. 30, 1926.

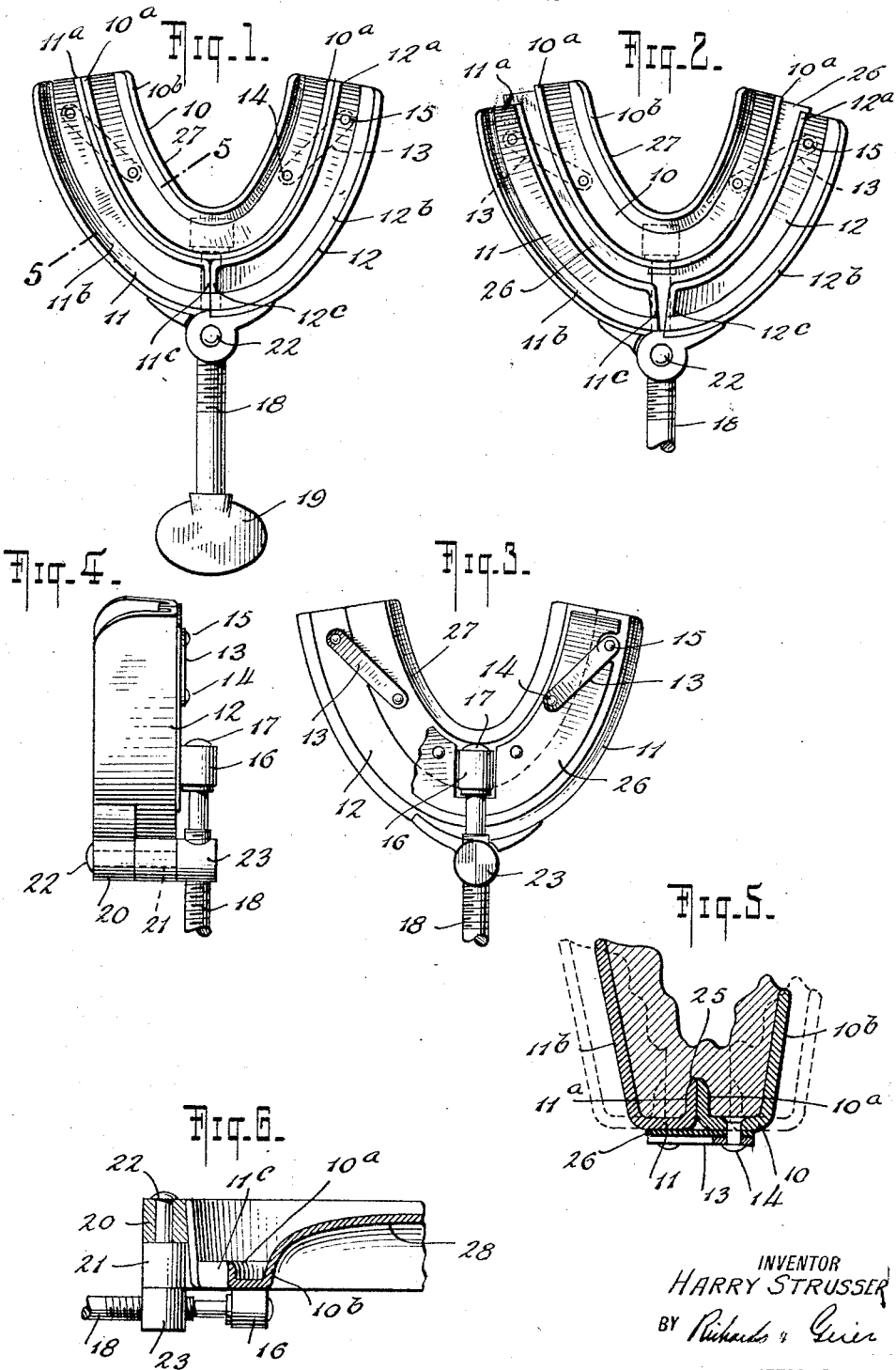

1,608,632

UNITED STATES PATENT OFFICE.

HARRY STRUSSER, OF NEW YORK, N. Y.

DENTAL IMPRESSION TRAY.

Application filed July 23, 1923. Serial No. 653,073.

This invention relates to that type of dental appliances known as impression trays such as are used by dentists for containing a mass of plaster of Paris or other suitable plastic material, the tray containing the plaster being inserted into the mouth of the patient, and by pressing the mass of plaster against the teeth and gums of the patient an accurate molded impression is made in the plaster of the conformation of the teeth and gums and surrounding tissues. It has heretofore been the usual practice to use a tray constructed of an integral sheet of metal and after the plastic material has set to remove the metal tray, then to cut the mold as nearly as possible along the line of the dental arch and to remove the mold in a plurality of sections which are pieced together after being removed from the patient's mouth. This cutting or separation of the mold is necessary because the natural bell shaped formation of the teeth and gums prevents the mold from being removed as a unitary structure without distortion of parts and it frequently is extremely difficult to secure a line of separation that will enable the separated parts of the mold to be readily reassembled and it is also difficult to remove the parts of the mold from the teeth with the required lateral horizontal movement necessary to ensure against accidentally disturbing the impression.

The principal object of this invention therefore is to provide a construction of a dental impression tray which will overcome the difficulties enumerated above.

Another object is to provide an impression tray by means of which the mold may be accurately separated along a median line by mechanical means associated with the tray so that the mold can be separated and removed from the patient's mouth simultaneously with the removal of the tray; thereby entirely avoiding the necessity for cutting the mold manually, with the consequent expenditure of time and effort required for this operation; and furthermore replacing an inaccurate manual cutting operation by an accurate mechanical separation.

A further object is to provide a construction by means of which the tray may be quickly adjusted to various sizes, thus enabling a single tray to be used for different mouth sizes instead of being compelled to rely upon a plurality of different sized trays.

For the accomplishment of these and such further objects as will hereinafter be apparent to those skilled in the art to which this appertains, the invention consists in the construction, combination and arrangement of parts herein specifically described and illustrated in the accompanying drawings, wherein is shown a preferred embodiment of the invention, but it is to be understood that changes, variations and modifications may be resorted to which fall within the scope of the claims hereunto appended.

In the drawings forming a portion of this specification:

Fig. 1 is a top plan view of a lower tray embodying my invention showing the tray in its closed position.

Fig. 2 is a similar view to Fig. 1 showing the parts in their opened position.

Fig. 3 is a bottom plan of the tray in closed position.

Fig. 4 is a side elevation.

Fig. 5 is a section on the line 5—5 of Fig. 1.

Fig. 6 is a longitudinal vertical section of a tray adapted to be used for the upper teeth or jaw.

Referring to Figs. 1 to 5 which show an impression tray for taking a mold or impression of the lower teeth and gums, or jaw, the tray consists of a central section 10, of a substantially parabolic shape in plan view to conform to the normal configuration of the dental arch. A pair of side sections 11 and 12 are pivotally connected along the axis of the central section and form when thus connected a parabolic configuration similar to the central section. The side sections are connected to the central section 10 by means of the links 13, the ends of which are pivotally connected by any suitable means such as the rivets 14 and 15 to the central and side sections respectively.

Depending from inner section 10 and preferably on the central line or axis of the parabola formed by said section is an apertured boss 16 in which is rotatably mounted the inner reduced end 17 of an adjusting screw 18, the outer end of said screw being provided with any suitably enlarged head such as 19 to enable the screw to be readily turned.

The side sections 11 and 12 are provided with the enlarged apertured bosses 20 and 21 respectively through which a pivot pin 22 passes to pivotally connect the said sections. Pivot pin 22 projects upwardly from the face of a nut 23, through which nut the screw 18 is threaded.

Each of the sections of a lower tray are of substantially similar cross sectional configuration and have an upwardly extending flange at the inner or adjacent edges thereof, these flanges being designated 10ᵃ, 11ᵃ and 12ᵃ respectively in each of the sections. The outer edges of the sections are provided with the flanges 10ᵇ, 11ᵇ and 12ᵇ, the flanges 10ᵇ at the outer edge of the central section being inclined at slightly greater angle to the base of the tray than the flanges 11ᵇ and 12ᵇ of the side sections. The central meeting edges of side sections 11 and 12 are also provided with flanges 11ᶜ and 12ᶜ which form a continuation of the flanges 11ᵃ and 12ᵃ.

Referring to Fig. 5 it will be noted that the flanges of the tray sections define a channelled shaped member and that the tops of the inner or adjacent flanges 11ᵃ, 10ᵃ are chamfered as at 25, to provide a knife like edge thus forming an incision in the plaster which causes a clean regular line of cleavage at the meeting edges of the mold sections when the parts of the mold are separated. The flanges 11ᶜ, 12ᵃ and 12ᶜ are also similarly chamfered.

A plate 26 is preferably secured to the bottom of the central section and serves to bridge across the space between the mold sections when they are separated as shown in Fig. 2, thus permitting the tray to be used for making various sizes of molds.

It will be noted that the central section of the lower tray shown in Figs. 1 to 4 inclusive is provided with a clearance space 27 at the center thereof for the patient's tongue while the upper tray shown in Fig. 6 has the outer flange of the central section extended to form a plate 28 shaped to conform generally to the conformation of the roof or palate of the average patient's mouth.

The operation of the device is as follows, assuming that an impression or mold of a patient's mouth is to be made, the tray is filled to a suitable height with plaster of Paris or any other suitable material, the tray being adjusted by the screw 18 to the required size. The tray with the plaster therein is inserted into the patient's mouth and placed in proper position therein, with the meeting edges of the side and central sections as nearly in vertical alignment with the dental arch as possible, after which the plaster filled tray is held firmly in position until the plaster has set. When it is desired to remove the mold the screw 18 is turned thus moving the parts to the position shown in Fig. 2. During this movement of the parts the shoulder formed by the reduced end of screw 18 will cause the central section 10 to be pushed away from nut 23. This movement of central section 10 will also cause the links 13 to swing the side sections 11 and 12 upon the pivot pin 22, thus moving the side sections laterally from the central section and in parallelism therewith and also separating the side sections along the meeting edge formed by the flanges 11ᶜ and 12ᶜ. As the central and side sections are thus separated the inner flanges 10ᵃ, 11ᵃ, 12ᵃ, 11ᶜ and 12ᶜ of the sections will cause the plaster of the mold to be pulled apart along a line substantially parallel to the dental arch as shown in dotted lines Fig. 5, and will also separate the outer half of the mold along the flanges 11ᶜ and 12ᶜ. The chamfered edges 25 will insure a clean sharp cleavage of the mold and as the mold will be separated into three separate sections entirely by a lateral translatory movement of the sections of the tray there will be no danger of injuring or destroying the accuracy of the impression. After the sections of the tray have been separated the tray with the sectional molds contained therein may be instantly removed from the patient's mouth the sections of the molds may be readily removed from the tray, and as the cleavage of the plaster has been clean and sharp the sections of the mold may be readily and accurately re-assembled to form the complete mold.

While I have shown the central section of the tray as having the plate 26 secured thereto for use when the tray is adjusted for larger molds, it will be evident that if desired a plurality of different sized plates could be inserted between mold sections for different adjustments without securing the plates directly to the tray. The special construction of the plate or bridge 26 is not an essential feature of the invention, any suitable means having an offset relation to one member and an overlapping relation to another member may be used without departing from the invention.

Having thus described my invention what I claim as new and desire to secure by Letters Patent is:—

1. A dental impression tray including a central section, a pair of pivotally connected side sections, a screw member connected to said central section and extending parallel with and movable along a line coincident with the axis of the parabola of said section to cause the latter to move away from said side sections, and connections between said central and side sections for simultaneously moving said side sections about their pivot and relative to the central section.

2. A dental impression tray including a central section, a pair of pivotally connected side sections, a screw member connected to said central section and extending parallel with and movable along a line coincident with the axis of the parabola of said section to cause the latter to move away from said side sections, and a link connecting said central section with each of the side sections and operable when the central section is moved by said screw to move said side sections about their pivot and relative to the central section.

3. A dental impression tray including a central section, a pair of pivotally connected side sections, a screw member connected to said central section and extending parallel with and movable along a line coincident with the axis of the parabola of said section to cause the latter to move away from said side sections, and a link connecting said central section with each of the side sections and operable when the central section is moved by said screw to move said side sections about their pivot and relative to the central section, said central and side sections having means to separate a mold in the tray into a plurality of parts when the sections are moved relative to each other.

4. A dental impression tray including a central section, a pair of side sections, a pivot for said side sections, a nut carried by said pivot, a screw member connected to said central section and extending through said nut in screw threaded engagement therewith and in a line coincident with the axis of the parabola of said section, said screw member being operable to move said central section away from said side sections, and means connecting said central and side sections for effecting a pivotal movement of the side sections relative to the central section when the latter is moved toward and away from said side sections by said screw member.

5. A dental impression tray including a central section, a pair of pivotally connected side sections, a screw member connected to said central section and movable along a line intersecting the plane of the longitudinal axis of the pivot for said side sections to cause said central section to move away from the side sections, and connections between said central and side sections for simultaneously moving the latter about their pivot and relative to said central section.

6. A dental impression tray including a central section, a pair of pivotally connected side sections, a screw member connected to said central section and movable along a line intersecting the plane of the longitudinal axis of the pivot for said side sections to cause said central section to move away from the side sections, said central and side sections having means to separate a mold in the tray into a plurality of parts when the sections are moved relative to each other, and links connecting the central and side sections for moving the latter about their pivot and relative to the central section.

In testimony whereof I have affixed my signature.

HARRY STRUSSER.